Nov. 4, 1958

G. V. RODGERS 2,859,439

BEARING SYNCHRONIZER

Filed June 26, 1956

2 Sheets-Sheet 1

INVENTOR
GEORGE V. RODGERS

BY

ATTORNEYS

Nov. 4, 1958 — G. V. RODGERS — 2,859,439
BEARING SYNCHRONIZER
Filed June 26, 1956 — 2 Sheets-Sheet 2

INVENTOR
GEORGE V. RODGERS

United States Patent Office 2,859,439
Patented Nov. 4, 1958

2,859,439

BEARING SYNCHRONIZER

George V. Rodgers, California, Md., assignor to the United States of America as represented by the Secretary of the Navy Application June 26, 1956, Serial No. 594,069

6 Claims. (Cl. 343—106)

(Granted under Title 35, U. S. Code (1952), sec. 266)

The invention described herein may be manufactured and used by or for the Government of the United States of America for governmental purposes without the payment of any royalties thereon or therefor.

The present invention relates to a bearing synchronizer and more particularly to a bearing synchronizer that transmits groups of pulses the time separation between which is indicative of azimuth. This application is a continuation-in-part of application Serial No. 575,290, filed March 30, 1956.

In the azimuth indicating system disclosed in application Serial No. 575,290, a "synchronizer" at a transmitting station utilizes pulse type equipment, such as distance measuring equipment (DME) to generate pulse trains containing information that defines each azimuth bearing. A "bearing indicator attachment," connected to an existing receiver, transforms the received bearing information into a dial indication of azimuth. The present invention is a synchronizer which is an improvement over the synchronizer disclosed in the azimuth indicating system of application Serial No. 575,290. A higher degree of accuracy is obtained in the present system by means of a vernier or multiple speed data system which more accurately controls the times of pulse transmission.

Accordingly, an object of the present invention is the provision of a synchronizer which in conjunction with a transmitter transmits pulse trains containing azimuth information.

Another object is to provide a transmitter for sequentially producing pulse groups wherein the pulses of each group are arranged to define an azimuth bearing.

A further object of this invention is the provision of a bearing synchronizer which utilizes a multiple speed data system to increase accuracy.

Figure 1:
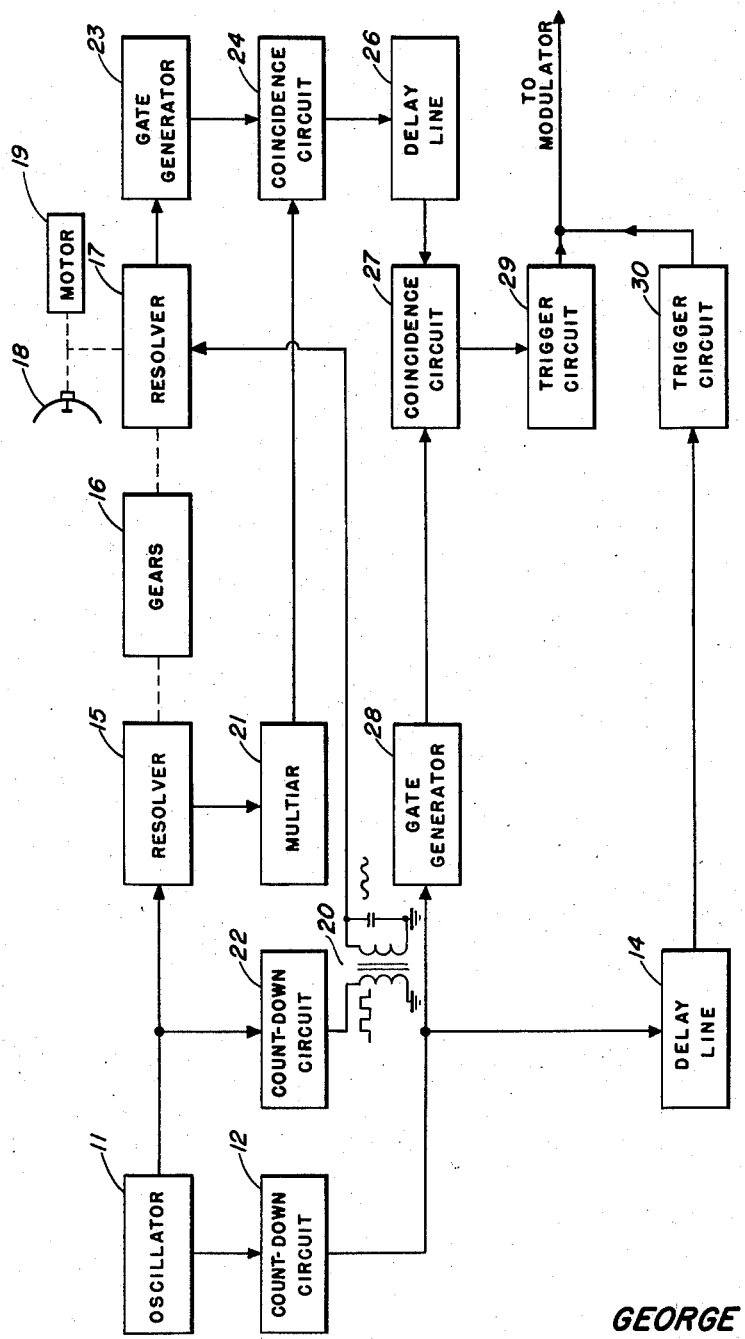
Figure 2:
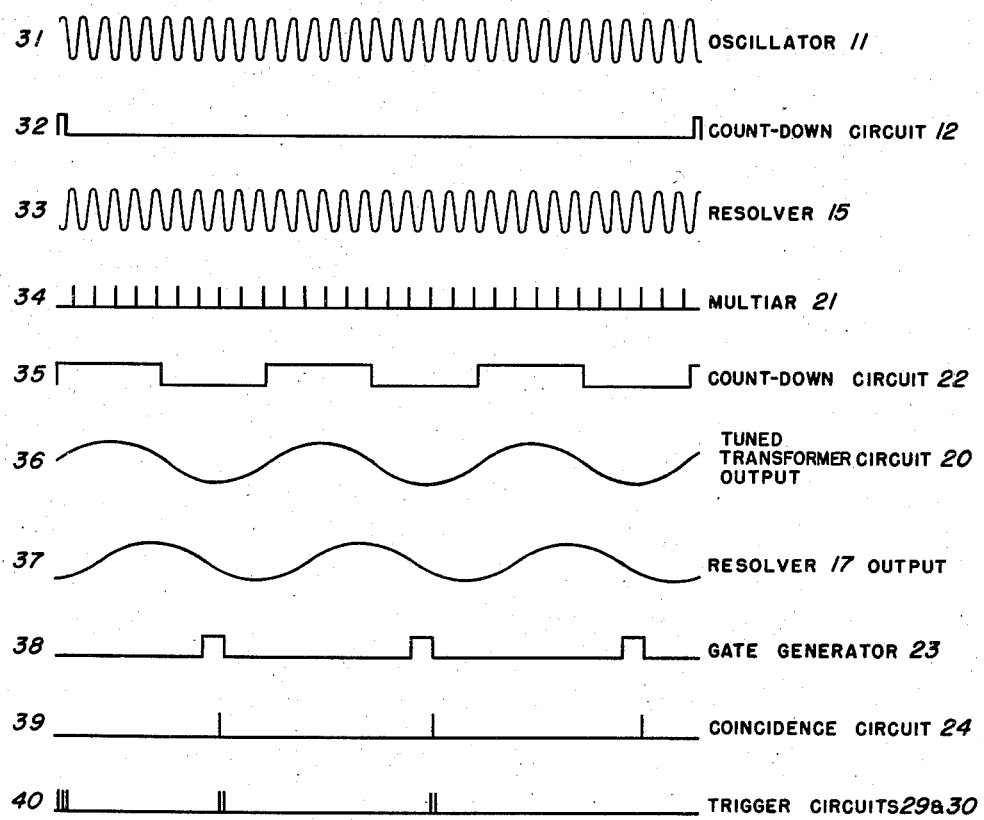

Other objects and many of the attendant advantages of the present invention will be readily appreciated as the same becomes better understood by reference to the following detailed description when considered in connection with the accompanying drawings wherein:

Fig. 1 shows a block diagram of a preferred embodiment of the present invention, and Fig. 2 is a graph illustrating the voltage wave forms of the outputs for many of the components of the block diagram of Fig. 1.

Referring now to the drawings, there is shown in Fig. 1 (which illustrates a preferred embodiment) an oscillator 11 that produces an A. C. wave the frequency of which is determined by the amount of desired microsecond change in output pulse spacing per degree of antenna rotation. This A. C. wave is fed to count-down circuit 12 which produces a square wave at the desired transmitter pulse repetition frequency which, for example, may be one-thirtieth of the frequency of the A. C. wave from oscillator 11. Delay line 14 converts each of the square wave pulses of one polarity from circuit 12 into three pulses that serve as a reference group. The delay between the first and third pulses of this group identifies the transmitting station and is the same as the DME reply pulse spacing on the same frequency channel. The output of oscillator 11 is applied also to phase shift resolver 15 which has a movable element whose movement is controlled by motor 19 through gears 16 and the synchronized movements of antenna 18 and a movable element of resolver 17. The displacements of the movable elements of resolvers 15 and 17 determine the phase shift produced by these resolvers. Resolver 15 produces a phase shift in the A. C. wave from oscillator 11 that is linear with respect to the rotation of antenna 18 but which is a multiple of the phase shift produced by resolver 17. For example, if this multiple is 10, then for a one degree rotation of antenna 18, resolver 17 produces a one degree phase shift and resolver 15 a ten degrees phase shift. This large phase shift of resolver 15 is obtained by the increased rotation of its movable element resulting from the step-up arrangement of gears 16. The phase-shifted waves from resolver 15 are fed to a multiar 21 which produces a basic bearing pulse each time these phase-shifted waves pass through a predetermined portion of their cycle; for example, when they pass through zero degrees in the negative direction. Multiar 21 is a pulse generator of the type described on page 345, volume 19 of the Radiation Laboratory series titled Waveforms, edited by Britton Chance et al. (McGraw-Hill, 1949). The output from oscillator 11 is fed also to count-down circuit 22 which produces a count-down equal to the step-up of the gears 16. The output from count-down circuit 22 is fed into tuned transformer 20 which produces a sine wave output. The sine wave count-down output from tuned transformer 20 is phase shifted linearly with respect to the rotation of antenna 18 by means of resolver 17 and is then fed to gate generator 23 and therein utilized to initiate short gates the lengths of which are equal to or less than the period between pulses of the output of multiar 21. Each of these short gates is generated at a preselected portion of the cycle of the phase-shifted sine wave from resolver 17, and thus the times of occurrence for these gates are functions of the angular position of antenna 18. Each short gate enables a single basic bearing pulse in coincidence circuit 24. The enabled basic bearing pulses are fed to delay line 26 which transforms each of them into two pulses spaced by a time separation that is identical to the spacing between the second and third pulses of the previously mentioned reference group. The pulses from delay line 26 form one input of coincidence circuit 27. The other input to this coincidence circuit is a gate signal generated by gate generator 28 when it is pulsed by the output from count-down circuit 12. The length of the gate from gate generator 28 is equal to two periods of the output from count-down circuit 22, and is thus long enough to ensure that two and only two groups of bearing pulses appear in the output pulse train at all times. As explained in co-pending application, Serial No. 575,290, these two groups of bearing pulses eliminates bearing errors or ambiguity in all of the azimuth sectors. The enabled bearing pulse groups from circuit 27 and the reference pulse groups from delay line 14 are connected through trigger circuits 29 and 30, respectively, where they are shaped, and then are combined to produce the triggering input for the transmitter modulator.

For a better understanding of the operation of the circuit of Fig. 1, reference is made to Fig. 2 wherein the voltage output wave forms for the outputs of some of the components of the circuit of Fig. 1 are displayed. Wave form 31 is the sine wave generated by oscillator 11 of Fig. 1. This sine wave is converted by count-down circuit 12 into a square wave 32 which is shown in Fig. 2 to have a period thirty times the period of wave 31. There are, of course, many other suitable values for the period of wave 32. Sine wave 33, the phase-shifted output from resolver 15, is the same as wave form 31 except it is shifted by an amount that is a function of a multiple of the angular displacement of antenna 18. Each pulse of the pulse wave form 34 is produced by multiar 21 of Fig. 1 when the phase-shifted sine wave 33 passes through a preselected point in its cycle. Square wave 35 of Fig. 2 is generated in count-down circuit 22 and has a frequency which is a sub-multiple of the frequency of wave form 31; this sub-multiple is the inverse of the multiple of gears 16. Sine wave 36 which is obtained from wave form 35 by means of the shaping transformer 20 and is of the same frequency and phase as square wave 35. Wave form 37 is a sine wave obtained from resolver 17 which phase shifts sine wave 36 directly with the angular displacement of antenna 18. Sine wave 37 is utilized by gate generator 23 of Fig. 1 to produce a wave form 38 which is a square wave having a short square wave pulse initiated at a certain portion of each cycle of sine wave 37 and having a duration that is no longer than the period between the pulses of wave form 34. This latter requirement ensures that no more than one pulse of wave form 34 is enabled by each square wave of wave form 38 in coincidence circuit 24. Wave form 39 is the pulse output of coincidence circuit 24 and comprises single enabled pulses from wave form 34. Wave form 40 is the output of the bearing synchronizer of Fig. 1 that is fed to the transmitter modulator and is a pulse train having a reference group comprising three pulses followed by two bearing groups each comprising two pulses.

It is to be realized that the function of the synchronizer embodiment of Fig. 1 is to produce pulse trains each of which has two groups of bearing pulses separated from a single group of reference pulses by a time which is a function of the instantaneous position of antenna 18. To be more specific, although the spacing between the two groups of bearing pulses is constant, the spacing between the group of reference pulses and the two groups of bearing pulses varies with the variation in angular position of antenna 18. This spacing can be utilized by an operator, at a receiver located some distance from this synchronizer, to determine his azimuthal position by simply measuring the time separation between the received groups of reference and bearing pulses. Referring now to both Figs. 1 and 2 to show the manner in which this time separation is obtained and more particularly to show how the present method of obtaining this time separation is an improvement over the method employed in application Serial No. 575,290: Upon the energization of the synchronizer of Fig. 1 by means of a switch, or the like (not shown), oscillator 11 initiates a sine wave 31 which count-down circuit 12 utilizes to produce a square wave 32 and also which count-down circuit 22 utilizes to produce a square wave 35. The positive short square wave pulse of wave 32 (this pulse could equally well be negative) operates through delay line 14 and trigger circuit 30 to cause the first reference pulse of the reference pulse group of wave 40 to be generated substantially instantaneously. Of course the other reference pulses in the reference pulse group follow the first pulse by time separations determined by the characteristics of delay line 14. Square wave 35 in count-down circuit 22 is converted to a sine wave 36 which is phase shifted by resolver 17 linearly with the rotation of antenna 18. For example, if the angular position of antenna 18 is 15 degrees from a reference azimuthal position, then sine wave 36 is phase shifted 15 degrees. The time of occurrence of the gates produced in gate generator 23 are determined by the amount of phase shift in the sine wave from resolver 17 since each of these gate pulses is initiated at a preselected point in the cycle of this sine wave. Thus, if this sine wave is shifted by 15 degrees, the generation of these gates is delayed by a time corresponding to 15 degrees (approximately 41.7 microseconds for a frequency of 1000 C. P. S.), in comparison to the time of generation of these gates for a zero degrees phase shift. If the time of initiation of these gates were exactly proportional to the angular position of antenna 18, there would be no need of resolver 15, gears 16, and multiar 21 and also oscillator 11 could then operate at a much lower frequency, but errors occur since the phase shift of sine wave 36 by resolver 17 is not exactly proportional to the angular position of antenna 18 and also generator 23 does not exactly initiate a gate at the proper point of the cycle of sine wave 37. In the previously mentioned application, Serial No. 575,290, a pulse generator is used instead of a gate generator 23 and there are no circuits corresponding to coincidence circuit 24, multiar 21, count-down circuit 22, resolver 15 and gears 16, and as a result the synchronizer has some errors due to the previously explained inaccuracies. These errors are substantially reduced in the present synchronizer by means of the added components as follows: Resolver 15 produces a phase shift in sine wave 31 that is a multiple of the phase shift produced by resolver 17 in sine wave 36. For example, if gears 16 have a ten to one ratio, then a 1.5 degree rotation of antenna 18 produces a 15 degree phase shift in the output from resolver 15. If multiar 21 produces pulses within .5 degree of the proper point at which the pulses should be produced, then the error has an effect of only one part out of thirty, whereas if the output from resolver 17 were fed to a multair, as in the previously mentioned application, Serial No. 575,290, the error would have an effect of one part out of three. The frequency fed to resolver 15 of the present synchronizer is made a multiple of that of the signal fed to resolver 17, this multiple being the same as the step-up multiple of gears 16, so that there is a pulse from multiar 21 at the time when there should have been a pulse from a multiar following resolver 17 if there had been no errors. Of course, due to the high frequency of the pulses from multiar 21 there are many more pulses than needed and ambiguity would result if it were not for the use of resolver 17, gate generator 23 and coincidence circuit 24. Resolver 17 and gate generator 23 act together to produce a gate pulse which has a sufficiently long period to cover the time when the basic bearing pulse should occur. This gate pulse is fed to coincidence circuit 24 and therein enables only one pulse from multiar 21 which occurs at a time that is quite close to being exactly proportional to the angular displacement of antenna 18. Delay line 26 produces a pair of bearing pulses for each enabled pulse and coincidence circuit 27, under the control of a gate from gate generator 28, permits only two of these pairs of bearing pulses to be in each pulse train. Thus, it is seen that each pulse train comprises one group of reference pulses followed by two groups of bearing pulses and in which the separation between the reference pulse groups and the two bearing pulse groups is a function of the angular position of antenna 18.

The components of the synchronizer of Fig. 1 have been shown in block diagram form only since there are many circuits suitable for each component, and they are all well known in the art. Specific circuits for most of these components are disclosed in application Serial No. 575,290. Also, many variations are possible in the synchronizer whereby the necessary voltage wave forms of Fig. 2 can be obtained.

Obviously many modifications and variations of the present invention are possible in the light of the above teachings. It is therefore to be understood that within the scope of the appended claims, the invention may be practiced otherwise than as specifically described.

What is claimed is:

1. In a transmitting system having a rotating antenna and modulator, a pulsing circuit for providing an input train of pulses to the modulator, said circuit comprising: means for producing an oscillating wave; means responsive to said oscillating wave for producing reference pulse groups at a rate which is a sub-multiple of the frequency of said oscillating wave; means responsive to the rotation of said antenna and said oscillating wave for producing basic bearing pulses at the frequency of said oscillating wave which are phase shifted from said oscillating wave by a multiple of the degrees of the angular displacement of said antenna from a preselected reference line; means for producing a sine wave at a frequency which is a sub-multiple of the frequency of said oscillating wave, this sub-multiple being the inverse of said multiple; means controlled by the angular displacement of said antenna for phase shifting said sine wave by the same number of degrees that said antenna is displaced from said preselected reference line; means for generating a short gate when said phase-shifted sine wave is at a preselected point in its cycle, the length of each short gate being no longer than the period between said basic bearing pulses; means responsive to said basic bearing pulses and said short gates for producing an output of the single basic bearing pulses that are coincident with the short gates; means energized by said single basic bearing pulses for producing a group of bearing pulses for each single basic bearing pulse; means for gating only two groups of bearing pulses after each group of reference pulses; and means for combining said gated groups of gearing pulses with said groups of reference pulses.

2. In a transmitting system having a rotating antenna and a modulator, a pulsing circuit for providing an input train of pulse groups to said modulator, said circuit comprising: means for producing an oscillating wave; means for producing reference pulse groups at a rate which is a sub-multiple of the frequency of said oscillating wave; means responsive to said oscillating wave and the rotation of said antenna for producing a first sine wave having the same frequency as said oscillating wave but which is phase shifted from said oscillating wave by a multiple of the number of degrees that said rotating antenna is displaced from a preselected reference line; means for producing a basic bearing pulse each time said first sine wave is at a preselected portion of its cycle; means for producing a second sine wave at a sub-multiple of the frequency of said first sine wave, said sub-multiple being equal to the inverse of said multiple; means for phase shifting said second sine wave by the number of degrees that said rotating antenna is displaced from said preselected reference line; means for generating a short gate pulse each time said phase-shifted second sine wave is at a preselected portion of its cycle, the length of each short gate pulse being no longer than the period between said basic bearing pulses; means responsive to said basic bearing pulses and said short gates for enabling the single basic bearing pulses that are coincident with said gates; means for producing a group of bearing pulses for each enabled basic bearing pulse; means for gating said groups of bearing pulses to permit only two groups of bearing pulses to follow each group of reference pulses; and means for combining said two groups of bearing pulses with said groups of reference pulses for feeding into said modulator.

3. In a transmitting system having a rotating antenna and a modulator, a pulsing circuit for providing an input train of pulse groups to said modulator, said circuit comprising: means for producing an oscillating wave; means responsive to said oscillating wave for producing groups of reference pulses at a rate which is a sub-multiple of the frequency of said oscillating wave; a first phase shifter having a movable element for phase shifting an input wave by an amount proportional to the displacement of said movable element; means for displacing said movable element of said first phase shifter through an angle that is a multiple of the angle through which said rotating antenna is displaced from a reference line; means for feeding said oscillating wave to said first phase shifter; means for producing gates of no longer duration than the period of said oscillating wave and at a rate which is equal to the frequency of said oscillating wave divided by said multiple and the times of occurrence of which are a function of the angular displacement of said rotating antenna from said reference line; means for producing a basic bearing pulse each time the output from said first phase shifter is at a preselected portion of its cycle; means for enabling those basic bearing pulses that are coincident with said gates; means for generating a group of bearing pulses for each enabled basic bearing pulse; means for gating said groups of bearing pulses to permit only two groups of bearing pulses to follow each group of reference pulses; and means for combining the gated groups of bearing pulses and the groups of reference pulses for feeding into said modulator.

4. The pulsing circuit of claim 3 wherein the means for periodically producing gates comprises: a circuit for producing a sine wave that has a sub-multiple frequency of the oscillating wave, and wherein said sub-multiple is the inverse of said multiple; a second phase shifter having a movable element for phase shifting said second sine wave proportionally to the displacement of said movable element; a mechanical connection joining the movable element of said second phase shifter to said rotating antenna whereby the antenna and said movable element rotate in unison; and means for generating each of said gates when said phase-shifted second sine wave is at a preselected portion of its cycle.

5. In a transmitting system having a rotating antenna and modulator, a pulsing circuit for providing a pulsating input to said modulator, said circuit comprising: a source for producing an A. C. wave, means fed by said A. C. wave for producing groups of reference pulses at a sub-multiple frequency of said A. C. wave, means fed by said A. C. wave and connected to said rotating antenna for producing basic bearing pulses at a rate equal to the frequency of said A. C. wave and at times that are a function of the multiple of the angular displacement of said rotating antenna from a reference line, means for gating said basic bearing pulses such that the times of occurrence of the gated pulses are directly related to the angular displacement of said rotating antenna from a reference line, means for producing a group of bearing pulses for each gated basic bearing pulse, and means for combining said groups of reference pulses and said groups of bearing pulses for feeding into said modulator.

6. The pulsing circuit of claim 5 wherein said means for gating said basic bearing pulses comprises: a circuit for producing a sine wave that is a sub-multiple of said oscillating A. C. wave, and wherein said sub-multiple is the inverse of said multiple; a phase shifter having a movable element for phase shifting said sine wave proportionally to the displacement of said movable element; a mechanical connection joining said movable element to said rotating antenna whereby the antenna and movable element rotate in unison; means for generating a short gate having a period less than period of said basic bearing pulses each time said phase-shifted sine wave is at a preselected portion of its cycle; and means responsive to said short gates and said basic bearing pulses for passing only those basic bearing pulses that are coincident with said short gates.

No references cited.